INVENTOR:
CHARLES B. AIKEN

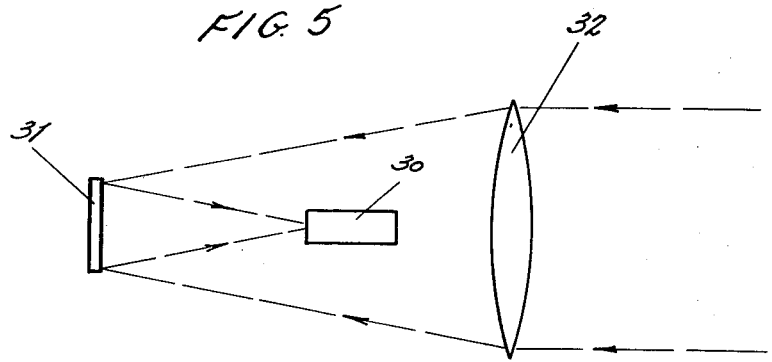
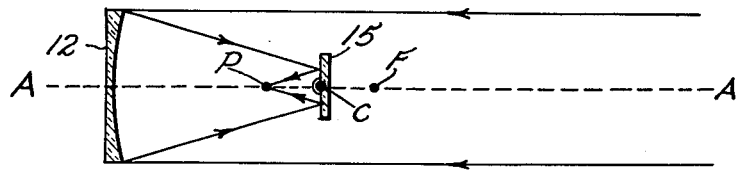
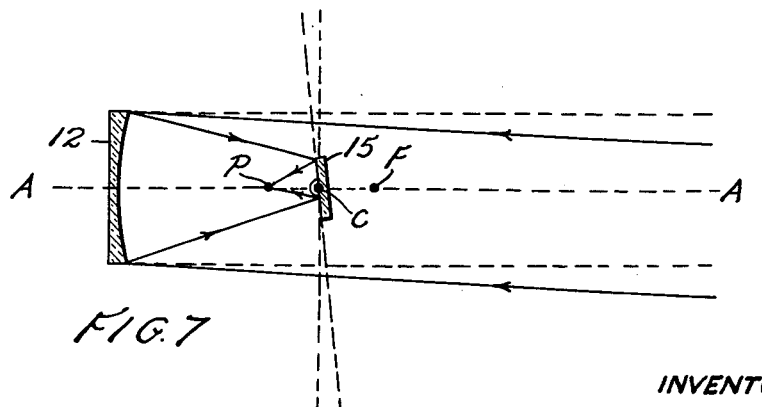

3,164,724
SCANNING APPARATUS FOR DETECTING A
RADIANT ENERGY SOURCE
Charles B. Aiken, R.D. 1, Wilton, Conn.
Filed Sept. 7, 1946, Ser. No. 695,568
3 Claims. (Cl. 250—216)

The present invention relates to scanning devices, and more particularly to new and improved scanning apparatus of the type used for detecting a distant source of radiant energy, although it is not limited to such use.

In some forms of scanning apparatus used heretofore for this purpose, means has been provided for interrupting periodically the radiant energy directed towards a receiver responsive to the particular type of radiant energy employed. Apparatus of this type is entirely satisfactory so long as no substantial amount of radiant energy is emitted from the background against which the source to be detected is viewed. If, however, the background does emit radiant energy, in a substantially uniform manner, such background energy will produce signals in the receiver which may not be distinguishable from the signals produced when the receiver views the distant source. The apparatus, therefore, cannot be used effectively for source detection purposes under such conditions.

It is an object of the invention, accordingly, to provide new and improved scanning apparatus for detecting a distant source of radiant energy, where the source is viewed against a background emitting energy of the same type as that emanating from the source.

Another object of the invention is to provide new and improved scanning apparatus of the above character which is small in size, light in weight, and easy to operate.

According to the invention, scanning apparatus is provided which comprises a reflecting member suitably shaped to direct energy from a distant source to a small reflector located between the reflecting member and the source. The reflector is oscillated through a small angle and causes a beam of radiant energy collected by the reflecting member to sweep periodically across a suitable receiver located on the axis of the reflecting member.

With this construction, it will be readily apparent that, when the scanning apparatus is directed at a relatively small source emitting radiant energy of substantially greater intensity than its background, the receiver will produce a strong and clearly distinguishable signal. But when the apparatus views only radiant energy from the background, which in many cases is moderately uniform through a small arc, the receiver output will be substantially uniform, and only a small disturbing signal will be generated, particularly if the angle of oscillation of the reflector is quite small, as it should be. The apparatus, thus, enables a source to be readily detected against a radiant energy emitting background.

The invention may be better understood from the following detailed description of a representative embodiment taken in conjunction with the accompanying drawings, in which:

FIGURE 5 is a schematic diagram of another embodiment of the invention;

FIGURE 6 is a schematic representation of the apparatus showing one position of the reflector in the scanning cycle; and FIGURE 7 is a schematic representation of the apparatus of FIGURE 6 showing the reflector at another position in the scanning cycle.

Figure 1:
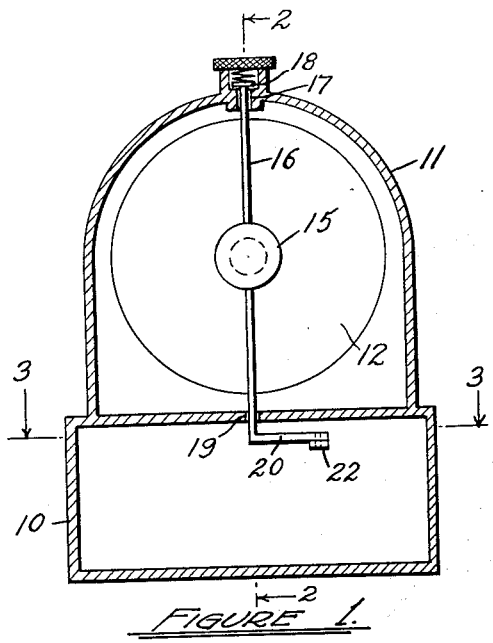
FIGURE 1 is a front view in vertical section taken along line 1—1 of FIGURE 2, looking in the direction of the arrows and showing scanning apparatus constructed according to the present invention.
Figure 2:
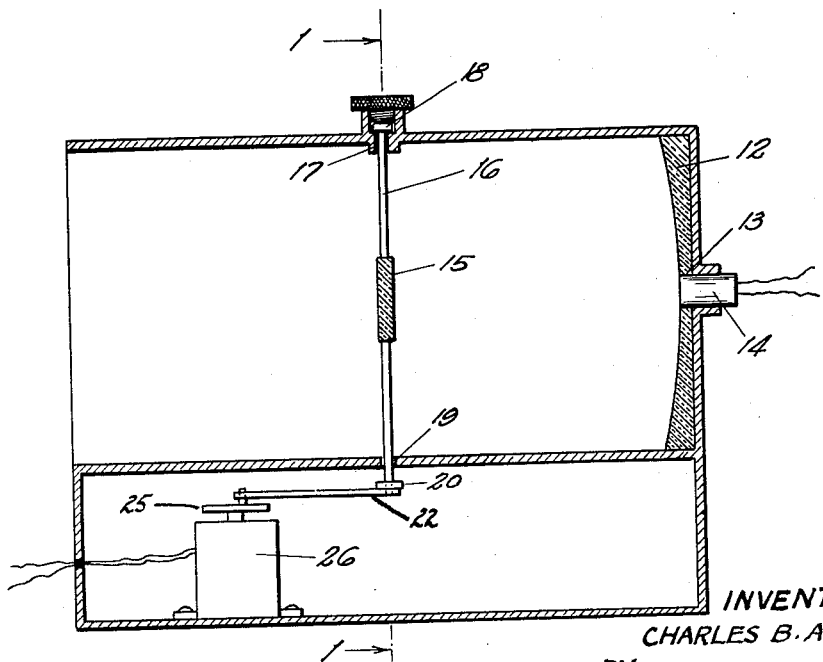
FIGURE 2 is a side view in vertical section, taken along line 2—2 of FIGURE 1, looking in the direction of the arrows.

Referring to FIGURE 1, a scanning apparatus is shown comprising a bottom support 10 on which is mounted a housing 11, which is open at the front end and which has a reflecting member 12 mounted at the rear end thereof. The reflecting member 12 may be a small spherical or other suitable concave mirror, for example, and it is provided with a bore 13 in the axis thereof in which is mounted a radiant energy receiver 14, (FIG. 2), which may be a bolometer or thermocouple, for example, if sources emitting thermal radiant energy are to be detected.

Mounted in front of the receiver 14 is a small reflector 15 which may be, for example, a small plane mirror. Preferably the reflector 15 should be so located that the distance along the axis of the system from the concave mirror 12 to the plane mirror 15, plus the distance from the latter to the bolometer 14 is approximately equal to the focal length of the concave mirror 12. The plane mirror 15 is adapted to be oscillated about a vertical axis in the scanning apparatus; it is mounted on a vertical shaft 16, the upper end of which passes through a bore 17 formed in the upper wall of the housing 11, and terminates in a supporting member 18. The lower end of the shaft 16 passes through a small bore 19 in the lower supporting member 10 and has secured thereto a crank arm 20.

Figure 3:
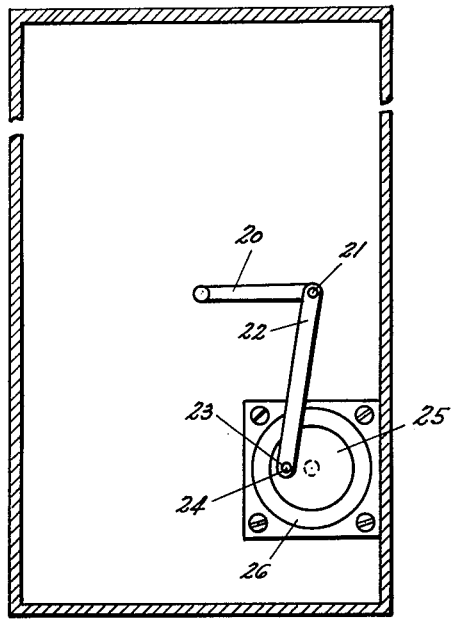
FIGURE 3 is a top view in horizontal section taken along line 3—3 of FIGURE 1, looking in the direction of the arrows, showing the motor for oscillating the mirror.
Figure 4:
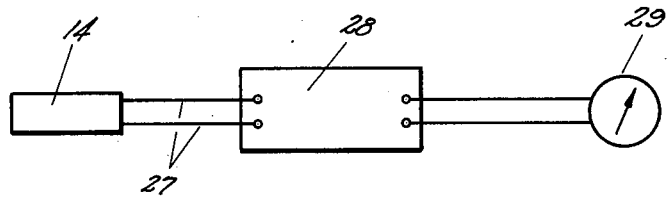
FIGURE 4 is a schematic diagram of a circuit in which the radiant energy detector may be connected.

The crank arm 20 (FIGURE 3) is pivotally mounted at 21 to one end of a connecting rod 22, the other end of which is pivotally mounted at 23 on a crank pin 24 on a disk 25, which is adapted to be rotated by a motor 26. The motor 26 is secured within the lower support member 10 and may be of any suitable type, energized in any suitable manner. If it is desired to vary the frequency of the oscillation of the mirror 15, the motor 26 should preferably be a synchronous motor energized from a source of alternating current of variable frequency, such as a conventional type power oscillator for example.

The receiver 14 may be connected by the conductors 27 to the input terminals of a conventional type amplifier 28, the output of which may be used to actuate an indicator 29 or control mechanism for causing the scanning apparatus to remain directed at the source of radiant energy which is to be detected.

In operation, the entire scanning apparatus may be moved slowly either horizontally or vertically to scan an area in search of a distant source of radiant energy. The motor 26 is energized during the scanning operation, so that the small plane mirror 15 is oscillated through a small angle which may be of the order of a few degrees. If the area viewed by the scanning apparatus comprises a background emitting radiant energy of the same kind that is emitted by the source to be detected, and if the intensity of the emitted radiation is substantially uniform, the output of the receiver 14 will be substantially uniform, and no signal will appear on the indicator 29 that might be mistaken for a signal produced by a small distant source of radiant energy. When, however, the source which is to be detected comes into the field of view of the scanner (assuming now that its intensity is appreciably greater than the intensity of the background, as will usually be the case) the output of the receiver 14 will suddenly increase, thereby producing a clearly distinguishable signal at the indicator 29.

Operation under the two conditions outlined above can be best understood by referring to FIGURES 6 and 7, and first to FIGURE 6 wherein the plane of mirror 15 is shown perpendicular to the axis of reflecting member 12. Rays which are parallel to the axis AA would normally come to focus at the point F, which is the principal focal point of the reflecting member 12. However, because of the interposition of the plane mirror 15, the rays are brought to focus at P.

In FIGURE 7, the mirror 15 has been rotated in a counter-clockwise direction about the point C, the angle of rotation being approximately 6°. Rays parallel to AA would no longer come to the point P. However, rays that slope upwardly towards the reflecting member 12 at exactly the right angle will be brought to focus at the point P, as shown in the drawing. It is evident that the received beam has been rotated through an angle of approximately 2.5° as a result of the 6° rotation of mirror 15. This relation between the two angles will vary with the geometry of the system, that is with the focal length of the reflecting member 12, and with the distance from F at which the mirror 15 is placed.

If the diameter of the plane mirror 15 is sufficiently large to intercept the entire converging bundle of rays reflected from the reflecting member 12, then the total amount of light focused at P will not vary during the course of the oscillation of the mirror 15, providing the energy radiating background is uniform throughout the arc over which the received beam is swept. Hence, the total amount of light received at P will be constant, and no alternating signal will be generated. On the other hand, when a target of small angular dimensions is present, a pulse of signal will be generated each time the beam sweeps across the target.

If desired, a lens 32 may be used instead of the concave mirror 12, as shown in FIGURE 5. In such case, the lens 32 should be disposed to receive radiant energy to be detected and, in conjunction with the oscillating plane mirror 31, to focus it on the bolometer 30 as shown in the figure.

From the foregoing, it will be understood that the invention provides new and improved scanning apparatus which enables a small distant source of radiant energy to be readily detected against a background emitting radiant energy of the same kind but of lesser intensity. By utilizing a small oscillating reflector in conjunction with a larger energy collecting, reflecting member of suitable shape, a scanning apparatus is provided which is responsive only to relatively sudden azimuthal changes in radiant energy emitted over an area that is being scanned. Moreover, since the only moving parts are the small plane mirror and the attached mechanical drive, the power requirements are small so that the scanning apparatus is relatively small in size and light in weight.

While the scanning apparatus comprising the present invention has been described above in connection with the detection of sources emitting thermal radiant energy, obviously it may be employed to detect sources emitting energy of other types, such as light, for example. In such case, a device sensitive to light radiation, such as a photoelectric cell, should be substituted for the thermocouple or bolometer 14.

It will be understood that the system described above may be used equally well with radio waves, particularly in the microwave region. In the case of very short radio wave, a large concave metallic reflector could be employed for the element 12, while the oscillating reflector 15 might be a thin sheet of metal, or a grid of wires parallel to the electric vector in the incoming radio wave. Because of the larger dimensions required for all reflecting elements, as compared with optical cases, a great saving would be realized in not having to oscillate the large and heavy element 12.

In the radio case, the invention would be useful in picking out a highly reflective object situated among moderately or poorly reflecting surroundings. Since natural objects do not emit radiation of radio frequencies themselves, it is necessary to direct radio waves from an auxiliary transmitter toward the area in which the reflecting objects are believed to be located. This area is then scanned with the apparatus described in the preceding paragraph. The receiving system should be highly directional, and the transmitter moderately so, in order that there will be very little direct reception. A reasonably large spacing between transmitter and receiver is also desirable, as an aid in cutting down direct reception.

While a specific embodiment has been described above, the invention is not intended to be limited thereto but is susceptible of numerous changes in form and detail within the scope of the appended claims.

I claim:

1. In scanning apparatus for detecting a radiant energy source, the combination of a curved reflecting member adapted to be directed towards said source of radiant energy, a small plane reflector located to receive radiant energy from said reflecting member, means for imparting a systematic oscillating movement to said plane reflector, and a radiant energy receiver located substantially on the axis of said curved reflecting member, the total distance from said reflecting member to said reflector and back to said receiver being substantially equal to the focal length of said reflecting member, whereby a beam of radiant energy from said plane reflector is swept across said receiver in such fashion that the receiver views adjacent zones in space successively and systematically in accordance with said to and fro movement.

2. In scanning apparatus for detecting a radiant energy source, the combination of a tubular housing having a viewing opening at one end, a concave mirror in said housing and having an axial aperture formed therein, a radiant energy receiver disposed to receive radiant energy directed towards said aperture, a small plane mirror located to receive radiant energy from said concave mirror and mounted for oscillatory movement about an axis perpendicular to the axis of said concave mirror, the total distance from said concave mirror to said plane mirror and back to said receiver being substantially equal to the focal length of said concave mirror, and means for imparting a small oscillatory movement to said plane mirror to cause a beam of radiant energy reflected therefrom to sweep across said receiver.

3. Scanning apparatus for detecting a radiant energy source comprising a tubular housing having a viewing opening at one end, a concave mirror in said housing and having an axial aperture formed therein, a radiant energy receiver mounted in said aperture, a small plane mirror located to receive radiant energy from said concave mirror and mounted for oscillatory movement about an axis perpendicular to the axis of said concave mirror, the total distance from said concave mirror to said plane mirror and back to said receiver being substantially equal to the focal length of said concave mirror, a motor for driving said plane mirror, operative connections between said motor and said plane mirror for imparting a small oscillatory movement to said plane mirror, and means responsive to the output of said radiant energy receiver.

References Cited in the file of this patent

UNITED STATES PATENTS

| | | |
|---|---|---|
| 1,771,148 | Sprague | July 22, 1930 |
| 1,901,400 | Marrison | Mar. 14, 1933 |
| 1,931,980 | Clavier | Oct. 24, 1933 |
| 1,967,214 | Acht | July 24, 1934 |
| 2,118,419 | Scharlau | May 24, 1938 |
| 2,132,676 | Chance | Oct. 11, 1938 |
| 2,133,615 | Gerhard | Oct. 18, 1938 |
| 2,273,447 | Ohl | Feb. 17, 1942 |
| 2,369,622 | Toulon | Feb. 13, 1945 |
| 2,403,660 | Hayward | July 9, 1946 |
| 2,419,024 | Iams | Apr. 15, 1947 |
| 2,465,898 | Martin | Mar. 29, 1949 |
| 2,491,192 | Martin et al. | Dec. 13, 1949 |
| 3,064,255 | Meneley | Nov. 13, 1962 |

FOREIGN PATENTS

| | | |
|---|---|---|
| 587,789 | Germany | Nov. 8, 1933 |
| 616,658 | Germany | Aug. 2, 1935 |
| 128,240 | Great Britain | June 26, 1919 |

OTHER REFERENCES

Summary Technical Report of N.D.R.C., Div. 16, vol. 8, 1946. Non-Image Forming Infrared, pp. 112–117.